United States Patent [19]

O'Hara et al.

[11] Patent Number: 4,790,324
[45] Date of Patent: * Dec. 13, 1988

[54] METHOD AND APPARATUS FOR MEASURING INTERNAL BODY TEMPERATURE UTILIZING INFRARED EMISSIONS

[75] Inventors: Gary J. O'Hara, Escondido; David B. Phillips, San Diego, both of Calif.

[73] Assignee: Intelligent Medical Systems, Inc., Carlsbad, Calif.

[*] Notice: The portion of the term of this patent subsequent to Jul. 29, 2003 has been disclaimed.

[21] Appl. No.: 31,164

[22] Filed: Mar. 25, 1987

Related U.S. Application Data

[63] Continuation of Ser. No. 869,578, Jun. 2, 1986, abandoned, which is a continuation of Ser. No. 663,769, Oct. 23, 1984, Pat. No. 4,602,642.

[51] Int. Cl.$^4$ ............................................. A61B 5/00
[52] U.S. Cl. ..................................... 128/664; 128/736; 374/2; 374/126; 374/129; 374/158; 374/164
[58] Field of Search ................ 128/664, 736; 374/121, 374/126, 129, 158, 2, 164, 170

[56] References Cited

U.S. PATENT DOCUMENTS

| | | | |
|---|---|---|---|
| 3,282,106 | 11/1966 | Barnes | 128/664 |
| 3,348,408 | 10/1967 | Engborg | 374/2 |
| 3,491,596 | 1/1970 | Dean | 374/139 |
| 3,507,153 | 4/1970 | Jones et al. | 128/736 |
| 3,581,570 | 6/1971 | Wortz | 128/736 |
| 3,949,740 | 4/1976 | Twentier . | |
| 4,183,248 | 1/1980 | West | 374/158 |
| 4,433,924 | 2/1984 | Quinn, III | 374/129 |
| 4,493,564 | 1/1985 | Epstein | 128/736 |
| 4,566,808 | 1/1986 | Pompei et al. | 374/121 |
| 4,634,294 | 1/1987 | Christol et al. | 374/129 |

OTHER PUBLICATIONS

J. W. Moore & R. S. Newbower, "Noncontact Tympanic Thermometer", Sep. 1978–Medical & Biological Engineering & Computing, pp. 580–584.

Primary Examiner—Ruth S. Smith
Attorney, Agent, or Firm—Baker, Maxham & Jester

[57] ABSTRACT

A hand held probe unit has an infrared sensitive thermopile mounted in a metal housing kept at a constant reference temperature by a regulator circuit. A waveguide tube, surrounded by a thermally insulative probe, directs infrared emissions to the thermopile. The thermopile and regulator circuit of the probe unit are electrically connected to processing circuitry in a chopper unit. Prior to taking a patient's temperature, the probe unit is mated with the chopper unit so that the thermopile detects infrared emissions from a reference target which is also kept at a constant reference temperature by another regulator circuit. The processing circuitry repeatedly acquires the output level of the thermopile and stores calibration data. The probe unit is then removed from the chopper unit, the probe is covered with an IR transparent, disposable speculum, and is inserted in the patient's external ear canal. The processing circuitry then determines the patient's core temperature by comparing the stored calibration data to the maximum output of the thermopile during a succession of ear canal samplings.

13 Claims, 9 Drawing Sheets

METHOD AND APPARATUS FOR MEASURING INTERNAL BODY TEMPERATURE UTILIZING INFRARED EMISSIONS

CROSS-REFERENCE TO RELATED APPLICATIONS

This application is a continuation of prior U.S. patent application Ser. No. 869,578 filed June 2, 1986 and now abandoned, which was in turn a continuation of prior U.S. patent application Ser. No. 663,769 filed Oct. 23, 1984 which is now U.S. Pat. No. 4,602,642 granted July 29, 1986.

CROSS-REFERENCE TO RELATED DISCLOSURE DOCUMENTS

Reference is made to applicants' Disclosure Document No. 109953 entitled "Non-Contact Infrared Thermometer" filed in the U.S. Patent and Trademark Office on July 19, 1982, Disclosure Document No. 113747 entitled "Continuous Roll-Feed Disposable Cover For Use With CoreTemp Thermometer" filed in the U.S. Patent and Trademark Office on Jan. 3, 1983, and Disclosure Document No. 119468 entitled "Infrared Thermometer For The Measurement Of The Temperature Of The Tympanum In The Body" filed in the U.S. Patent and Trademark Office on Aug. 8, 1983.

BACKGROUND OF THE INVENTION

The present invention relates to medical instrumentation, and more particularly, to a system for measuring the core temperature of the human body by detecting and analyzing infrared emissions in the external ear canal of a patient.

The diagnosis and treatment of many body ailments depends upon an accurate reading of the internal or core temperature of a patient's body, and in some instances, upon a comparison to a previous body temperature reading. For many years, the most common way of taking a patient's temperature involved the utilization of a Mercury thermometer. This approach has a number of drawbacks. First of all, such thermometers are normally made of glass. They must be inserted and maintained in the patient's mouth or rectum for several minutes. This is often discomforting to the patient. Furthermore, such thermometers can break, resulting in serious lacerations or mercury poisoning. In addition, Mercury thermometers are difficult to read, must be sterilized, and must be "shaken down" vigorously to place the Mercury at the bottom end prior to use.

Because of the above drawbacks of conventional Mercury thermometers, electronic thermometers were developed and are now in widespread use. Typically, such electronic thermometers have a probe connected by wires to a remote unit containing an electronic circuit. The probe is sheathed in a protective, disposable cover before being inserted into the patient's mouth or rectum. Using predictive techniques, the patient's temperature reading is taken in a significantly shorter time period, for example thirty seconds, compared to the several minutes required for conventional Mercury thermometers. Such electronic thermometers normally have meters or other displays which enable the operator to determine the temperature much more readily than reading the position of the terminal end of a column of Mercury in a glass tube. Also, the electronic thermometers in some instances provide more accurate temperature readings than Mercury thermometers. Furthermore, the protective sleeves are disposable, thus allowing the same thermometer to be used over and over without autoclaving or other sterilization.

The tympanic membrane is generally considered by the medical community to be superior to oral, rectal or axillary sites for taking a patient's temperature. This is because the tympanic membrane is more representative of the body's internal or core temperature and more responsive to changes in the core temperature. Heretofore, efforts to provide a method and apparatus for measuring the body temperature via the external ear canal have not been successful. U.S. Pat. No. 3,282,106 of Barnes suggests the concept of an infrared thermometer that may be placed in the ear cavity to measure body temperature.

Infrared sensing devices have been commercially available for measuring the skin temperature of a patient. However, a patient's skin temperature varies over a much wider range than his or her internal body temperature and is not generally used by physicians in the diagnosis and treatment of illnesses. Furthermore, these devices are large and cumbersome and not suited for detecting infrared emissions in the external ear canal.

U.S. Pat. No. 3,581,570 discloses a tympanic temperature sensing device which has positioning means to establish a fixed relationship between the eardrum and a radiometer. The radiometer is a thermister, bolometer or thermocouple. The circuit consists of merely an amplifier and a calibrated galvanometer. A polyethylene shield fits over the probe portion to protect the radiometer.

Attempts have also been made to determine a patient's body temperature via the external ear canal using devices other than infrared sensors. For example, U.S. Pat. No. 3,054,397 discloses the concept of inserting a thermoelectric probe which may contain a thermocouple or a thermistor into the ear until it touches the tissues, for example the eardrum. This type of measurement is not practical for every day hospital or clinical use because of danger of injury to the eardrum. It also may expose the patient to considerable anxiety if not pain.

U.S. Pat. No. 3,491,596 discloses the concept of placing a probe containing a field effect transistor into the ear canal to measure the radiated energy. In one embodiment, a heater element is used to preheat the field effect transistor to the approximate temperature to be sensed to reduce the response time.

U.S. Pat. No. 3,626,757 describes an ear thermometer which contains a probe which must make contact with the tympanum. This device is too invasive and slow in response for routine hospital use.

U.S. Pat. No. 4,191,197 discloses a touch free tympanic thermometer in which heated air having a temperature value close to body temperature is blown against the eardrum. The actual body temperature is determined by measuring the temperature of the returning air. Clearly, this device would have serious accuracy limitations.

Another tympanic thermometer which s commercially available is the MON-A-THERM Model 6000. It uses a thermocouple as the sensing transducer. Contact with the tympanic membrane is required which is painful and potentially hazardous to the patient. The device also requires two to three minutes to arrive at the temperature.

SUMMARY OF THE INVENTION

Accordingly, it is the primary object of the present invention to provide a method and apparatus for measuring the internal temperature of a patient's body by sensing infrared emissions in the external ear canal.

It is another object to provide such a method and apparatus which does not require physical contact with the tympanic membrane.

It is another object of the present invention to provide an improved method and apparatus for measuring the internal temperature of a patient's body which requires substantially less time than required by conventional Mercury thermometers or electronic predictive-type thermometers.

Still another object of the present invention is to provide a method and apparatus for measuring the internal temperature of a patient's body which requires less patient cooperation than conventional methods and which can be performed on sleeping, comatose, or otherwise incapacated patients.

The illustrated embodiment of our invention comprises three different units which cooperate both mechanically and electrically. A probe unit is grasped by the operator's hand to take a patient's temperature. The probe unit is connected by a cord to a base or chopper unit held in the operator's other hand. The probe and chopper units are physically mated between temperature readings for recalibration. The mated probe/chopper unit combination seats in a stationary charger unit when not in use.

The probe unit has a handle and a head assembly terminating in a probe which is inserted into the external ear canal. The head assembly contains an infrared sensitive thermopile detector embedded in a metal housing.

The housing is heated to a precise ear canal temperature, e.g. 98° F., by resistors energized by a probe controller circuit and regulated through a thermistor. A tubular metal waveguide forms the actual probe whose forward end is inserted into the ear canal. The rearward end of the waveguide is seated in the temperature controlled metal housing such that there is an air gap between the waveguide and the thermopile. The probe unit further includes an amplifier for boosting the thermopile output, an LED "reading complete" indicator, and a SCAN switch which is depressed by the operator to indicate that the waveguide of the probe has been placed in the ear canal.

The chopper unit includes an external housing configured to mate with the probe unit so that its waveguide is received in a receptacle. A permanent magnet in the probe unit closes a reed switch in the chopper unit to indicate that the two units are mated. A target is mounted in the receptacle in the field of view of the probe unit infrared detection components. The target is heated to a predetermined reference temperature, e.g. also 98° F., by resistors energized by a chopper controller circuit and regulated through a thermistor. The chopper unit further includes a function keypad and digital processing circuitry for calibrating the system and determining the internal body temperature based on the output of the thermopile when the waveguide is in the ear canal. An LCD on the chopper unit displays function and temperature information.

The charger unit is configured to mate with the joined probe and chopper units. The charger unit has an AC/DC power supply which induces current in the chopper unit to charge its batteries through inductor coils.

In operation, when the probe unit is cradled in the chopper unit, the digital processing circuitry continuously samples the keypad for function initiation and calibrates the thermopile against the target. Calibration is accomplished by determining the target temperature through its associated thermistor, determining and storing the thermopile output level associated with that temperature, and then repeating the same steps for a requisite minimum time period to insure stability. The user then removes the probe unit from the chopper unit and places an infrared transparent disposable speculum over the waveguide tip. The protected tip is then partially inserted into the patient's ear canal. The SCAN button is then depressed. The digital processing circuitry repeatedly examines the thermopile output and determines the body's internal temperature. In so doing, the thermopile output level is compared to the stored calibration level. The internal body temperature which has been determined is displayed on the LCD. When the probe unit is therafter rejoined with the chopper unit, the calibration process is repeated.

DESCRIPTION OF THE PREFERRED EMBODIMENT

Figures 1, 3, 5:
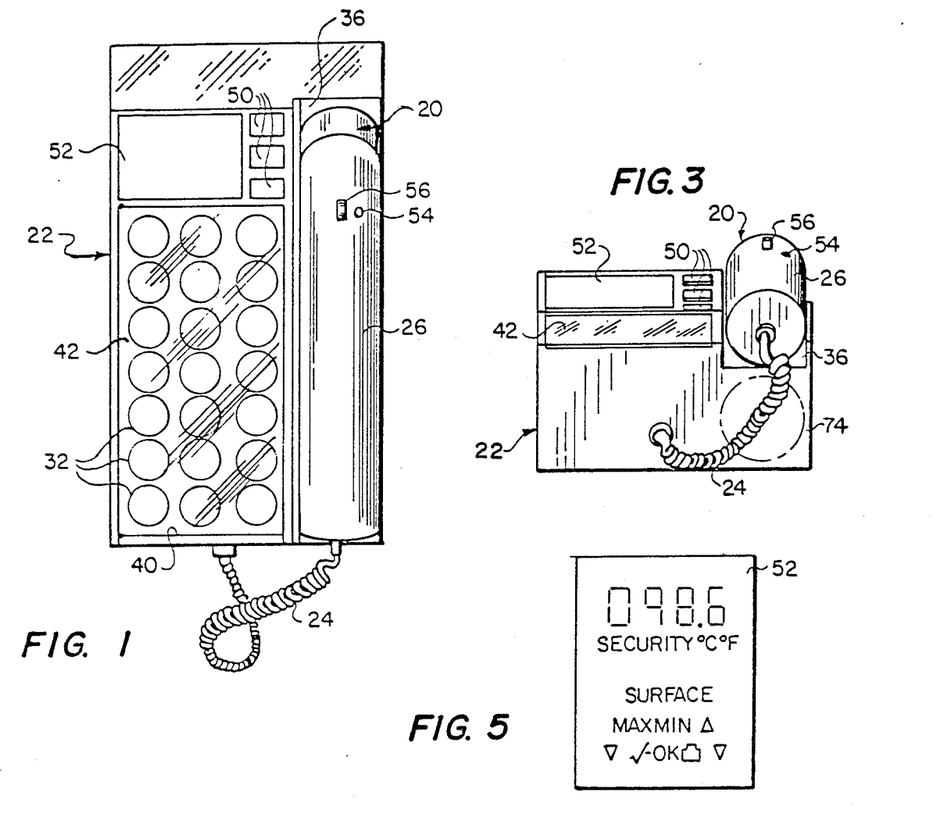
FIG. 1 is a top plan view of the mated probe and chopper units of the preferred embodiment of our system.
FIG. 3 is an elevation view taken from the bottom or rear end of FIG. 1.
FIG. 5 is an enlarged view of the liquid crystal display of the chopper unit of the preferred embodiment of our system.

Referring to FIG. 1, the preferred embodiment of our system includes a probe unit 20 which mechanically mates with a chopper unit 22. Internal electronics of the probe and chopper units are electrically connected through a cord 24 which attaches to the rearward ends of the units. The probe unit 20 has a cylindrical handle 26 adapted to be grasped by the hand of the user. A head assembly 28 (FIGS. 2 and 6) extends from the forward end of the handle at an angle with respect thereto. The head assembly 28 terminates in a probe 30 (FIGS. 2 and 6) which is covered by a disposable plastic speculum 32 (FIG. 7). The shielded probe is inserted into the external ear canal 34 (FIG. 6) of a patient in taking his or her temperature.

Figure 2:
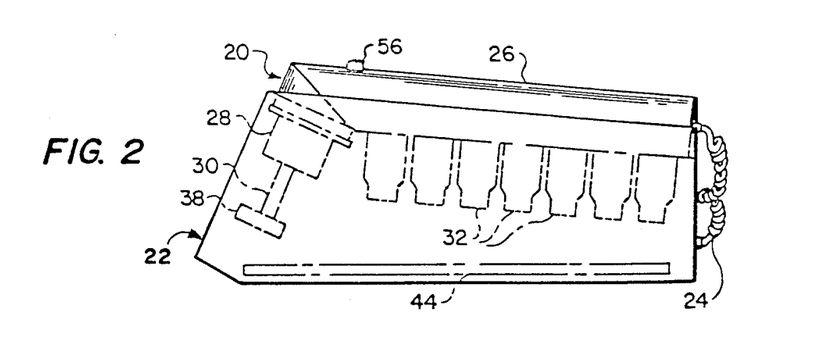
FIG. 2 is an elevation view taken from the left hand side of FIG. 1 and illustrating in phantom lines the probe head assembly and chopper target, a plurality of disposable speculums stored in the chopper unit, and the outline of a printed circuit board mounted in the chopper unit.

Referring to FIGS. 1-3, the chopper unit 22 has a generally rectangular, box-like outer configuration. An upwardly opening elongate recess 36 extends along the top of the chopper unit 22 adjacent one side edge thereof. The recess 36 receives and aligns the cylindrical handle 26 of the probe unit 20 so that the head assembly 28 thereof is inserted into a receptacle communicating with the recess 36. This positions the head assembly 28 as illustrated in FIG. 2 so that the forward terminal end of the probe 30 is adjacent a heated target 38 mounted at the bottom of the receptacle.

Another upwardly opening rectangular cavity 40 (FIG. 1) formed in the top of the chopper unit 22 holds a plurality of disposable speculums 32 as illustrated in FIGS. 1 and 2. The speculums are covered by a transparent door 42 (FIG. 1) which is hinged along one side edge to allow access to the speculums. A printed circuit board 44 (FIG. 2) is mounted within the chopper unit 22 and serves as a carrier for the electronics illustrated in FIG. 8b.

A permanent magnet 46 (FIG. 8a) closes a reed switch 48 (FIG. 8b) in the chopper unit to indicate that the two units are mated. The permanent magnet 46 and the reed switch 48 are mounted at locations within the probe handle and chopper housing, respectively, so that they are physically adjacent when the probe handle is cradled in the chopper unit as illustrated in FIGS. 1-3.

The chopper unit 22 further includes a function key pad having keys 50 (FIG. 1) and a liquid crystal display 52 (FIGS. 1 and 5). This display indicates measured temperature and certain other functions of the system as described hereafter in greater detail. The probe unit 20 also has an LED 54 (FIGS. 1 and 3) which is illuminated to indicate that a temperature reading has been completed. A manually actuable SCAN key 56 on the handle of the probe unit is depressed by the user's thumb to indicate that the probe 30 has been inserted into the patient's ear canal and thereby initiate sensing of infrared emissions therein.

Figure 4:
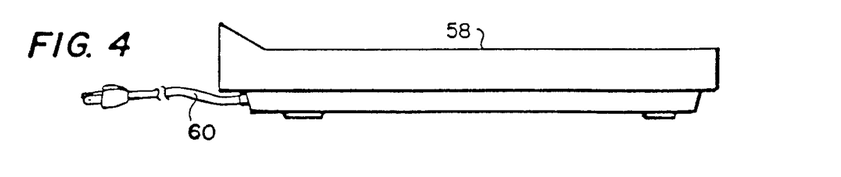
FIG. 4 is a side elevation view of one form of the charger unit of the preferred embodiment of our system.
Figure 8A:
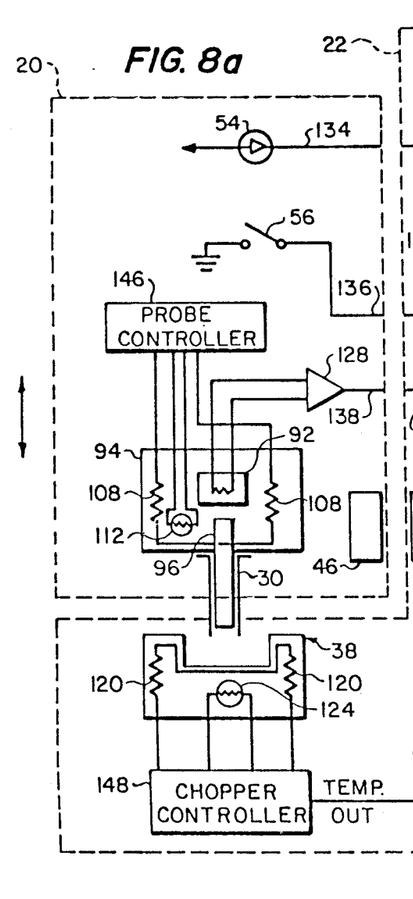
FIG. 8a is a block diagram of the electronics of the probe unit of the preferred embodiment of our system.
Figure 8B:
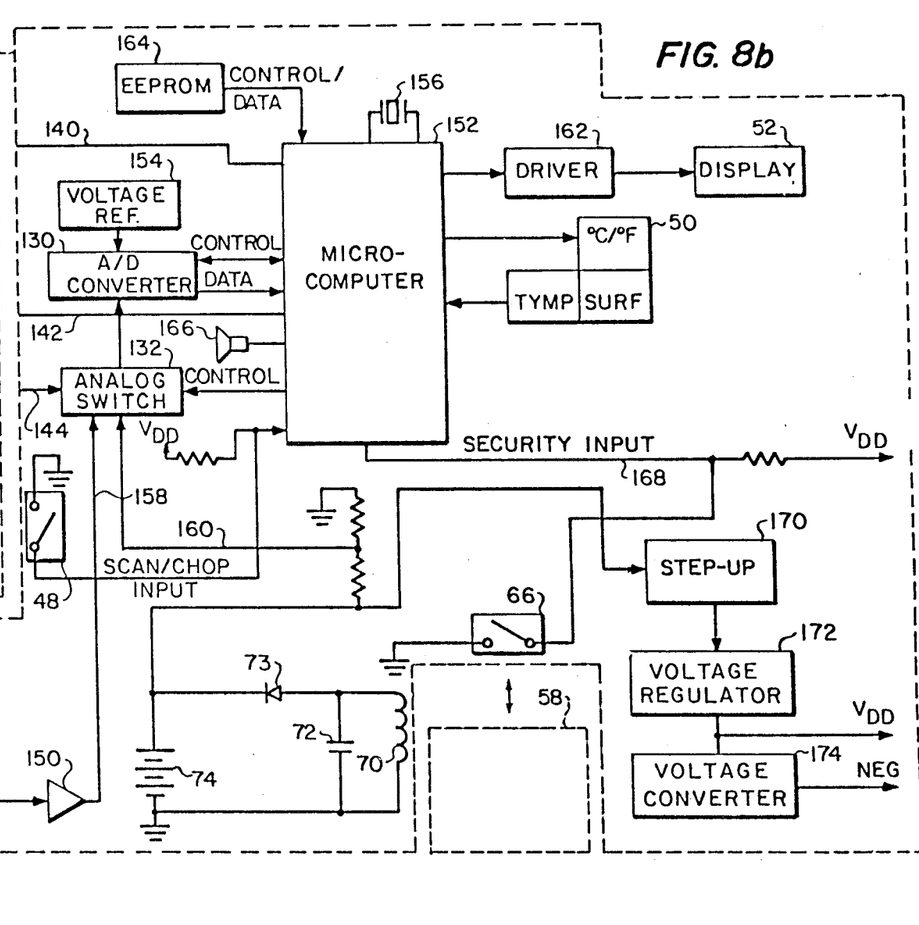
FIG. 8b is a block diagram of the electronics of the chopper unit of the preferred embodiment of our system.
Figure 8C:
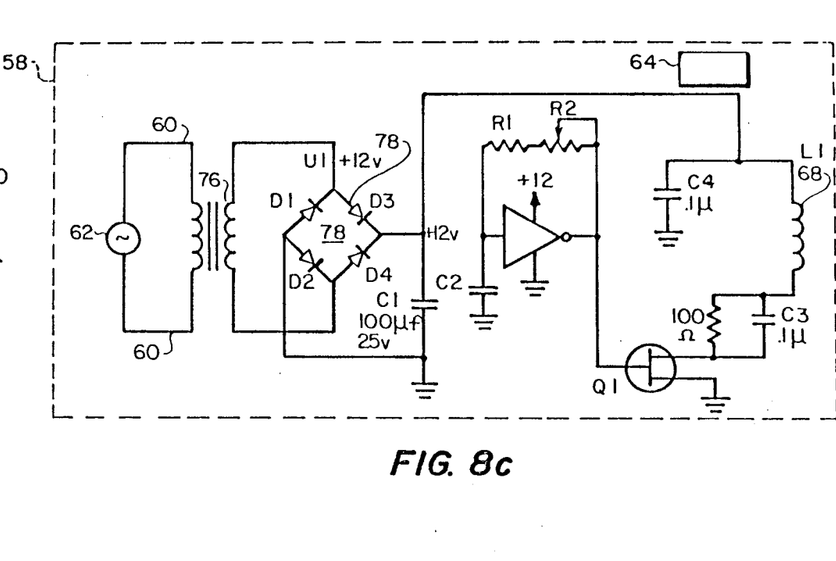
FIG. 8c is a block diagram of the electronics of the charger unit of the preferred embodiment of our system.

Referring to FIG. 4, the charger unit 58 of the preferred embodiment of our system includes a rectangular outer housing with the power supply circuitry of FIG. 8c mounted therein. A cord 60 connects the power supply to a standard 115 volt AC power source 62 such as a conventional wall outlet. The charger unit 58 is configured to mechanically mate with the joined probe and chopper units. When this is done, a permanent magnet 64 (FIG. 8c) within the charger unit closes a reed switch 66 (FIG. 8b) in the chopper unit 22 to provide a signal indicative of the mated relationship. DC current from the charger unit 58 is induced in the chopper unit 22 through a connectorless arrangement. Specifically, a first coil 68 (FIG. 8c) and a second coil 70 (FIG. 8b) are positioned within the charger unit housing and chopper unit housing, respectively, so that when these units are d the coils will be closely adjacent to each other, although physically separated by the housing material and a slight air gap. A capacitor 72 (FIG. 8b) is connected across the coil 70. One side of the coil 70 is connected through a diode 73 for charging a set of batteries 74 (FIGS. 3 and 8b) mounted within the chopper unit beneath the probe recess 36. The charging circuit (FIG. 8c) includes a transformer 76 and a rectifier bridge 78. The transformer steps the 120 volt AC line current down to twelve volts. The twelve volt AC current is rectified by the bridge 78 and filtered by a capacitor C1. The resulting nominal twelve volts DC is used to supply U1 which is an inverter with hystersis. This inverter U1 has a feedback through a resistor R1, a capacitor C2 and a potentiometer R2 to cause oscillation at the resonant frequency of the coil 70 and capacitor 72 (FIG. 8b). The square wave output of the inverter U1 is fed to a FET Q1 (FIG. 8c) that drives a coil L1, driving through current limitors in the form of a resistor R3 and a capacitor C3. The potentiometer R2 is used to "tune" the circuit to provide the optimum current out to the battery.

Figure 6:
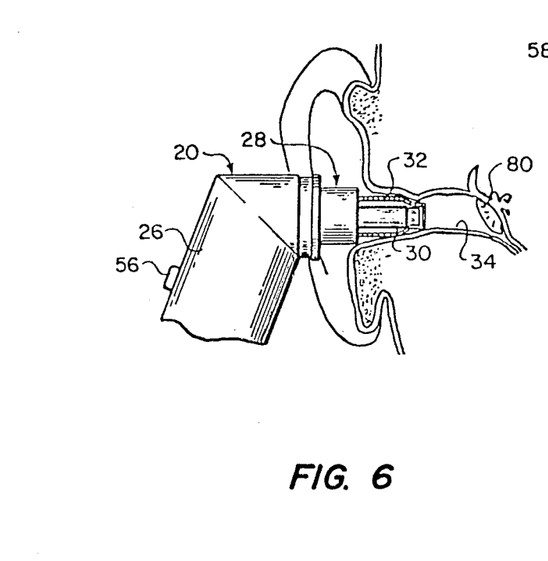
FIG. 6 is a side elevation view of a portion of the probe unit of the preferred embodiment of our system illustrating the manner in which its speculum shielded probe is inserted into the external canal of a patient in order to take his or her temperature.
Figure 7:
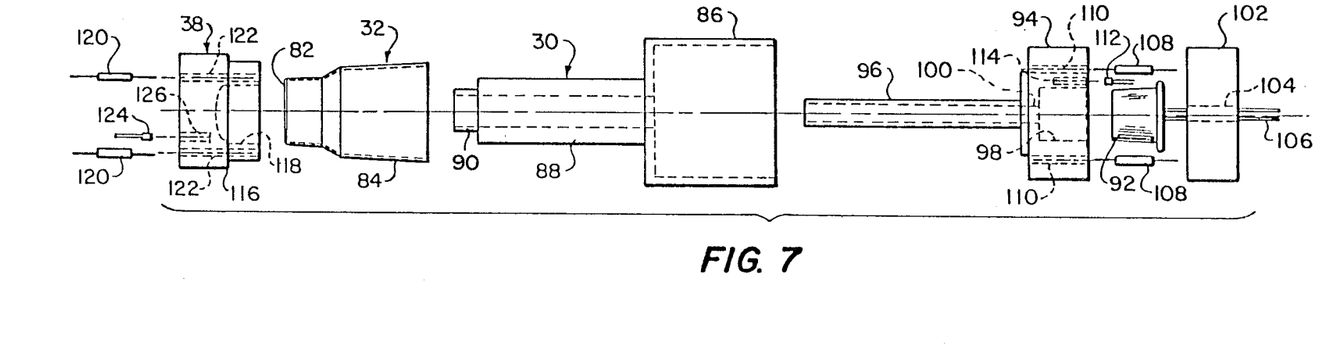
FIG. 7 is an enlarged, exploded side elevation view illustrating from left to right the chopper target, disposable speculum and infrared probe head assembly components of the preferred embodiment of our system. The parts illustrated in FIG. 7 each have a round cross section and their hollow internal cavities are defined by phantom lines.

As illustrated in FIG. 6, the probe 30 covered by the speculum 32 is inserted into the ear canal approximately one-quarter of an inch for approximately one to two seconds to measure the temperature of the tympanic membrane 80 and the ear canal 34. The speculum presents a clean, sanitary surface to the patient and also keeps the probe tip free of ear wax and hair. The speculum 32 has a frontal, circular membrane 82 (FIG. 7) which is substantially transparent to infrared radiation in the seven to ten micron wavelength. As illustrated in FIGS. 6 and 7, preferably the body 84 of the speculum 32 has a generally frusto-conical shape and has a hollow interior. The thickness of the speculum body 84 is substantially greater than that of the frontal membrane 82 in order to provide an adequate degree of structural rigidity. Preferably, the frontal membrane 82 and body 84 of the speculum are made of a pliant plastic material which is substantially transparent to infrared radiation in the desired frequency range. Polyethylene or polypropylene may be used, for example. The body 84 of the speculum is configured and dimensioned so that it will squeeze over the frontal portion of the probe 30. The pliancy of the speculum allows it to deform somewhat upon insertion into the ear canal for added comfort.

The probe 30 (FIG. 7) is preferably made of a material with very low thermal conductivity, such as a PVC plastic. The probe has a hollow cylindrical base portion 86, an intermediate tubular portion 88 and a cylindrical tip portion 90.

Besides the probe 30 the head assembly 28 (FIG. 2) of the probe unit further includes a thermopile detector 92 which is embedded into a cylindrical metal housing 94. A metal tube 96 has its rearward end secured to the center of the cylindrical housing 94 and acts as a waveguide for the infrared emissions which pass through the frontal membrane 82 of the speculum, through the center of the tube 96 to the frontal sensing region of the thermopile 92. One suitable thermopile is the Model 2M commercially available from Dexter Research located in Michigan. The cylindrical housing 94 is preferably made of metal such as aluminum and has a central cylindrical bore 98 for receiving the cylindrical outer case of the thermopile 92. The thermopile is preferably seated in thermal grease to insure thermal conductivity between the thermopile and the metal housing 94. A central aperture 100 also formed in the metal housing 94 permits infrared radiation transmitted through the interior of the waveguide tube 96 to impinge upon the frontal sensor region of the thermopile 92. The tube 96 is preferably made of brass and its interior walls are preferably plated with gold. Preferably there is a small air gap, for example .002 inches between the rearward end of the waveguide tube 96 and the frontal sensor region of the thermopile 92. The tube 96 extends through the intermediate tubular portion 88 of the probe 30. There is also preferably a small air gap between the exterior surfaces of the waveguide tube 96 and the interior surfaces of the tubular portion 88 of the probe 30. The metal housing 94 which serves as a mounting for the thermopile 92 fits within the cylindrical base portion 86 of the probe. A cylindrical backplate 102 (FIG. 7) overlies the rearward surface of the thermopile 92 and also fits within the cylindrical base portion 86 of the probe 30. The backplate 102 has a central hole 104 through which the leads 106 of the thermopile extend.

Figure 9:
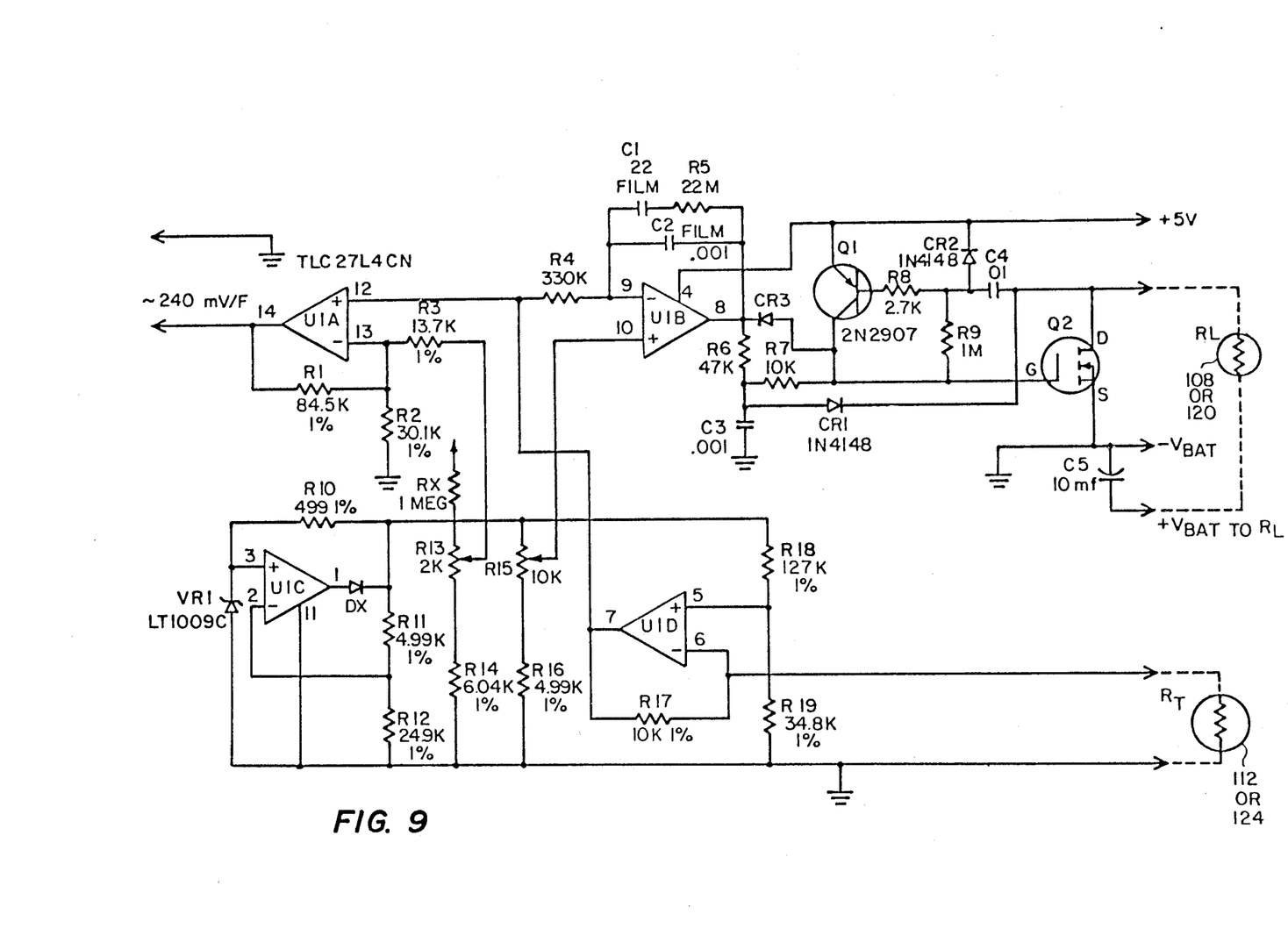
FIG. 9 is a schematic diagram of the circuit which is utilized twice in the preferred embodiment of our system, once as the probe controller and once as the chopper controller.
Figure 10:
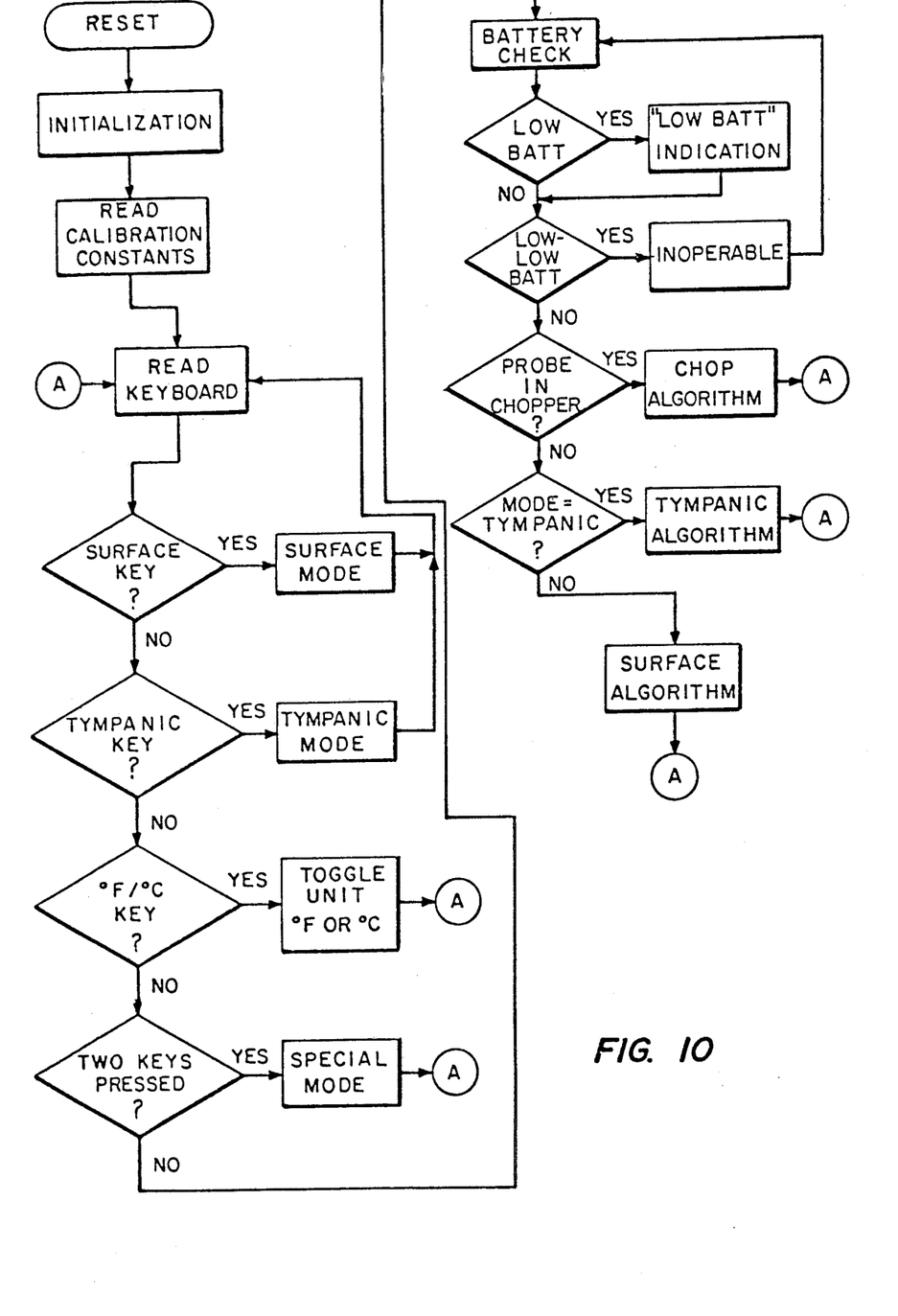
FIG. 10 is a flow diagram of the main loop of the control program of the preferred embodiment of our system.
Figure 11:
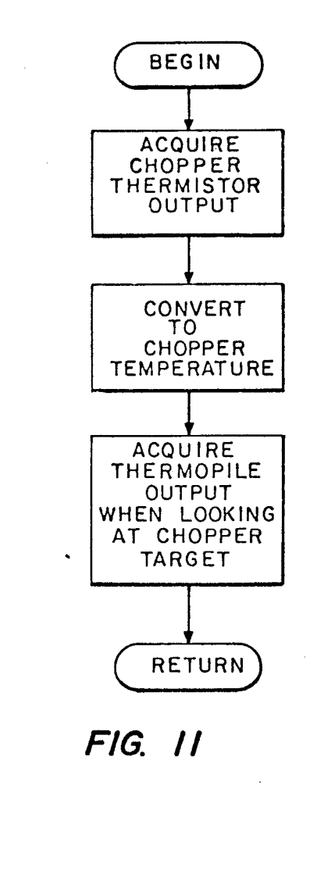
FIG. 11 is a flow diagram of the chop algorithm of the control program of the preferred embodiment of our system.
Figures 12, 13:
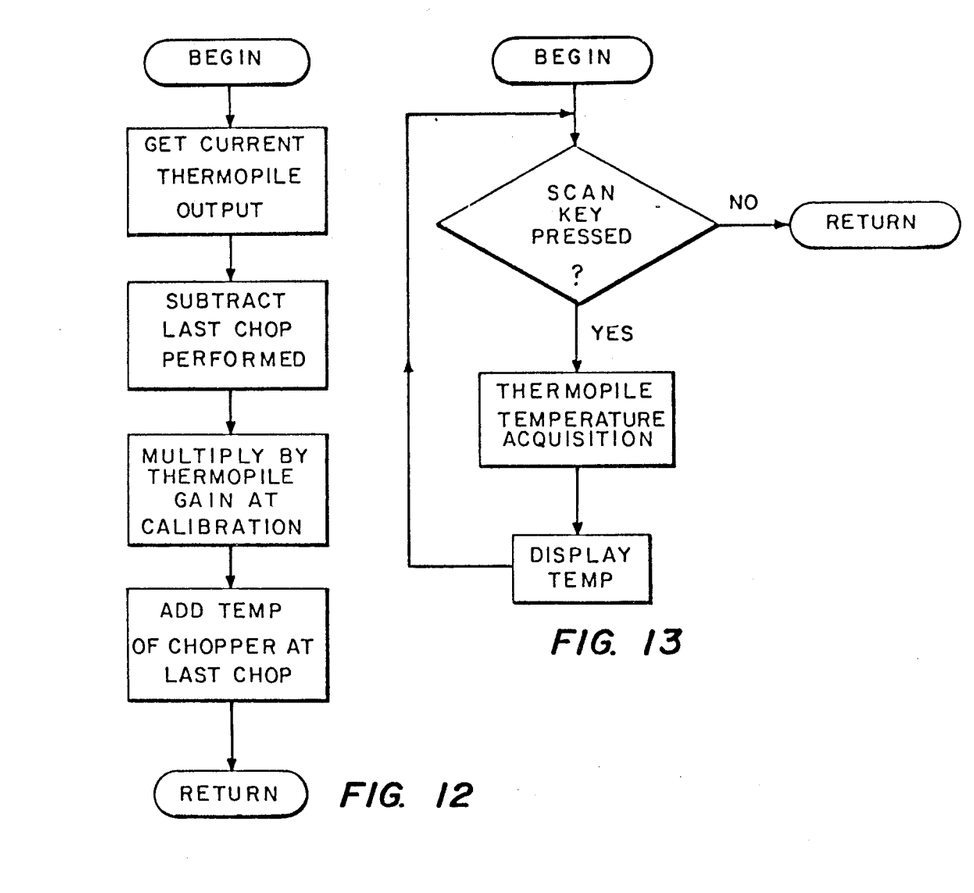
FIG. 12 is a flow diagram of the thermopile temperature acquisition algorithm of the control program of the preferred embodiment of our system.
FIG. 13 is a flow diagram of the surface algorithm of the control program of the preferred embodiment of our system.
Figure 14:
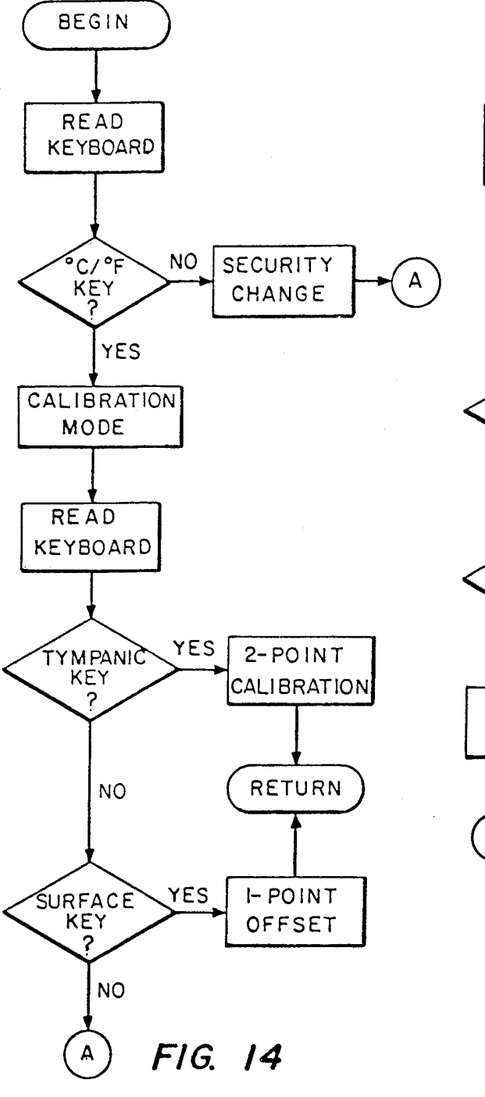
FIG. 14 is a flow diagram of the special functions mode algorithm of the control program of the preferred embodiment of our system.
Figure 15:
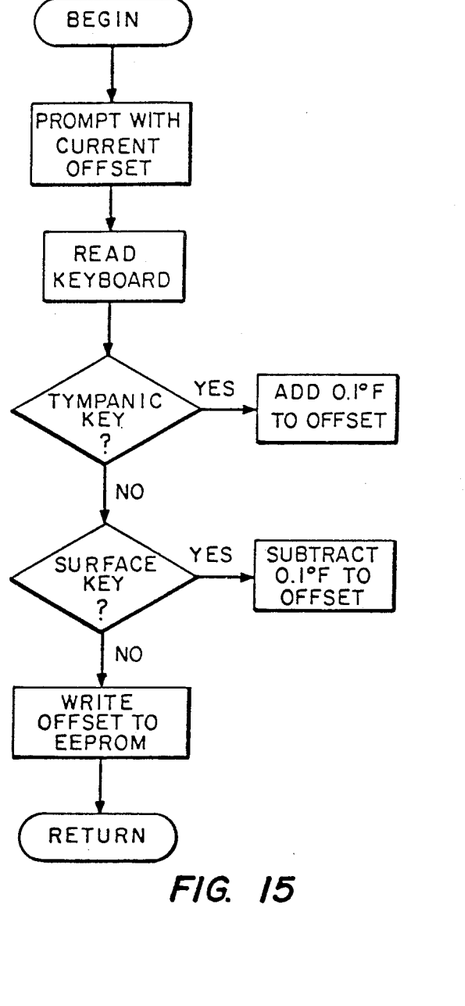
FIG. 15 is a flow diagram of the algorithm of the control program of the preferred embodiment of our system which accomplishes 1-point offset calibration of the chopper.
Figure 16:
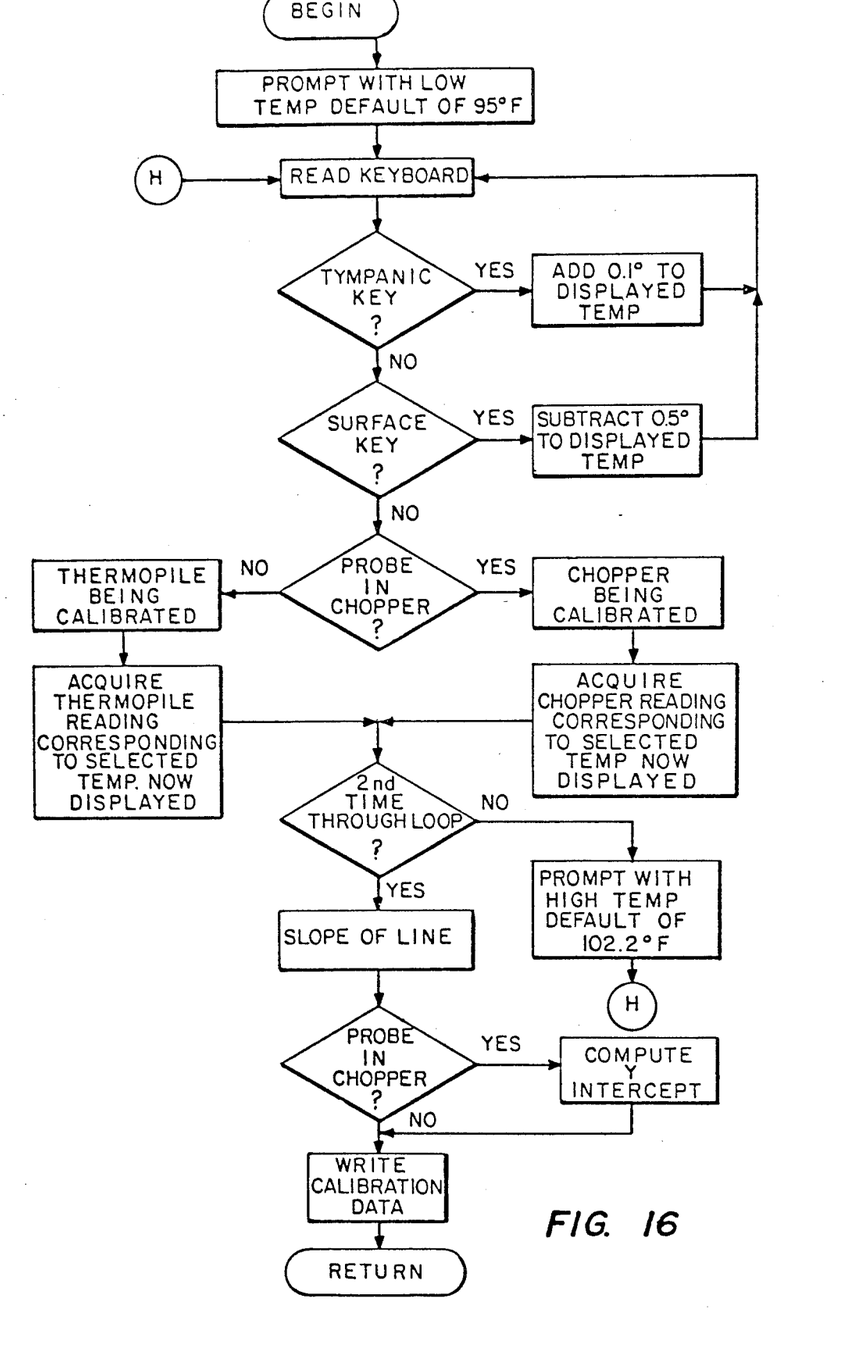
FIG. 16 is a flow diagram of the algorithm of the control program of the preferred embodiment of our system which accomplishes 2-point calibration of the thermopile or chopper.
Figure 17:
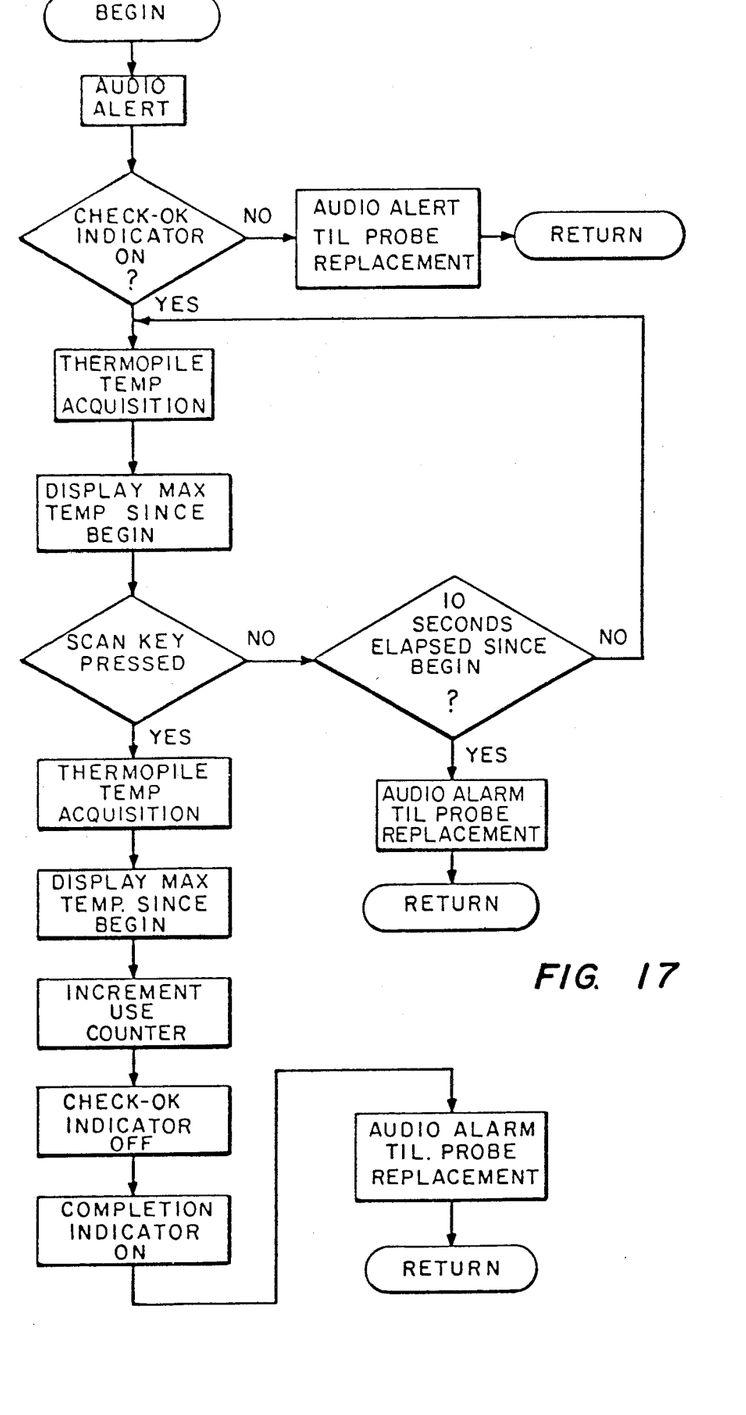
FIG. 17 is a flow diagram of the tympanic algorithm of the control program of the preferred embodiment of our system.

The metal thermopile housing 94 (FIG. 7) is heated to a predetermined precise temperature by resistors which are energized and controlled through the circuit of FIG. 9 as hereafter described in greater detail. The resistors 108 fit snugly within holes 110 drilled through opposite sides of the thermopile housing. The resistors may also be packed in thermal grease to insure thermal conductivity between the thermopile housing and the resistors. The temperature of the thermopile housing is precisely controlled through a thermistor 112 (FIG. 7) which fits within a hole 114 drilled in the thermopile housing 94. The thermistor may be similarly packed in thermal grease. The thermistor forms part of the regulating circuit of FIG. 9 hereafter described in greater detail.

The forward projecting leads of the resistors 108 (FIG. 7) are connected in an annular groove (not illustrated) formed in the frontal surface of the thermopile housing 94. The rearward leads of the resistors 108 as well as the leads of the thermistor 112 also extend through holes (not illustrated) in the cylindrical backplate 102.

The construction of the target 38 (FIG. 2) is illustrated in detail in FIG. 7. It includes a cylindrical member 116 preferably made of metal such as aluminum. The frontal side of the target member 116 has a central, outwardly opening cylindrical cavity 118 formed therein. Preferably the target member surfaces, including the surfaces of the cavity 118, have a black anodized finish which has an emissivity very near that of skin, i.e. .99 in the infrared wavelength of interest. A pair of heating resistors 120 are snugly mounted within holes 122 which extend through opposite sides of the target member 116. An annular groove (not illustrated) extends around the frontal surface of the target member 116, outside of the cavity 118 and the forward leads of the resistors 120 extend in the groove and are connected in series. A thermistor 124 snugly fits within a hole 126 in the target member 116. The resistors 120 and the thermistor 124 are also preferably packed in thermal grease to insure thermal conductivity with the aluminum target member 116. The target is heated to a precise predetermined temperature, such as 98° F. This temperature is precisely controlled by a circuit of the type illustrated in FIG. 9 which is identical to the separate circuit which controls the temperature of the thermopile housing 94.

The target 38 is situated in the chopper unit 22 such that the field of view of the thermopile is within the cavity 118 of the target when the probe unit is mated with the chopper unit as illustrated in FIG. 2. In other words, when the probe and chopper units are so mated, the forward end of the waveguide tube 96 (FIG. 7) is positioned within, but does not touch, the walls of the cavity 118 of the target member 116. The bottom wall of the cavity 118 is preferably concave. Of course, before the probe unit is seated in the chopper unit, the speculum 32 is removed from the probe. The speculum 32 is illustrated in FIG. 7 merely to show its dimensional relationship with the probe 30.

The chopper target 38 is heated to a predetermined target reference temperature, e.g. 98° F. The thermopile is thereby calibrated to a temperature near the core body temperature. This approach yields higher accuracy than if the target were allowed to fluctuate with the ambient room temperature. Since the target is close to the body temperature, any changes in the gain of the thermopile 92 or its associated circuitry hereafter described will result in less error. Linearization of the output of the thermopile need not be as precise to attain high accuracy in the desired 95° F. to 102° F. range.

Referring to FIG. 8a, the electronics of the probe unit 20 are illustrated in functional block form. The thermistor 92 in the probe head assembly is connected to an amplifier 128 which boosts the thermopile output to a voltage level suitable for inputing to the A/D converter 130 (FIG. 8b) in the chopper unit 22 through analog switch 132. Leads 134, 136 and 138 (FIG. 8a) from the LED 54, SCAN switch 56 and amplifier 128, respectively, are connected via cord 24 to leads 140, 142 and 144, respectively, of the chopper unit circuitry illustrated in FIG. 8b. A probe controller circuit 146 (FIG. 8a) is used to maintain the thermopile housing 94 at a precise, predetermined ear canal reference temperature, preferably 98° F. There are two principal reasons for heating the probe head assembly 28 to such a precise reference temperature. First of all, when the probe 30 is inserted into the external ear canal there is much less heat flow out of the ear canal than if the probe were at a cooler ambient temperature. Thus, there is much less error in the system due to "drawdown". Secondly, the thermopile 92 is a relative device which measures the energy level emitted by a target relative to the temperature of the reference. The thermopile therefore must be compensated for changes in the reference temperature. Furthermore, the output of the thermopile is not linear with temperature but behaves according to the following equation:

$$E = K(T_2 - T_1)^4$$

where
  E is the thermopile output;
  K is a constant related to the sensitivity of the optical detector system;
  $T_2$ is the target temperature; and
  $T_1$ is the reference temperature.

By keeping the thermopile temperature constant, no compensation for absolute reference temperature or changes in gain due to non-linearity have to be made.

FIG. 9 is a schematic diagram of one circuit suitable for use as the probe controller circuit 146. The output of the thermistor 112 is applied to pin 6 of an amplifier U1D which amplifies the signal and provides an output on pin 7. This output is further amplified through amplifier U1A using resistors R1 and R3 for gain control and resistor R2 as an offset. The output of amplifier U1D is also fed into amplifier U1B and is referenced against the input on pin 10. The input on pin 10 is the voltage that represents the desired reference temperature. If the temperature is too high, the resistance of the thermistor 112 decreases. This causes a signal on pin 7 of the amplifier U1D to be more positive. This positive input into the amplifier U1B through pin 9 causes the signal on pin 8 to go more negative and decreases the current in the heater resistors 108.

The absolute value of the desired thermopile housing reference temperature is represented by the voltage from the arm of a potentiometer R15 (FIG. 9). This means that the supply voltage must be very stable. The supply voltage comes from an amplifier U1C. The reference is a Zener diode VR1 and the supply current to the reference is supplied through resistor R10. The amplifier U1C amplifies the voltage by the ratio of resistors R11 and R12. Since it is possible for the output of the amplifier U1C to be low, a diode DX and a resistor RX are used to "start" the circuit.

When a linear device such as a transistor is used to drive a heater element, the control device may have as much as one-half of the power lost in it. This might occur, for example, when there is an equal voltage across both the control device and the load. If a pulse with a variable duty cycle is used to drive the heater, there is very little loss in the driver because it has no current through it, or it has no voltage across it, and thus no power.

In the circuit of FIG. 9, the analog output of the control amplifier U1B is used to control what is basically a voltage controlled multivibrator. The control voltage from the amplifier U1B goes through resistors R6 and R7 to the gate of a field effect transistor Q2 that has the load connected to its drain. A transistor Q1 has a large value resistor R9, for example one megohm, connected from its base to its collector, and is used to start the switch cycle. When the field effect transistor Q2 begins to conduct enough current to change the voltage across the resistor R1 which is the load resistor, this voltage is coupled through a capacitor C2 and a resistor R5 to drive the transistor Q1. Since the transistor Q1 is already conducting or near conducting, it will drive Q1 with the output from the collector of Q2, and Q2 will in turn drive the transistor Q1 so that both transistors are fully on. When a capacitor C4 and a resistor R8 have discharged a capacitor to the point that the transistor Q1 will no longer hold a transistor Q2 on, the drain of the transistor Q2 will go positive and turn the transistor Q1 off. A diode CR2 is used to restore the charge on the capacitor C4. When the drain of the transistor Q2 is low, the diode CR1 pulls the positive voltage on a capacitor C3 to near ground. Then, when the transistor Q2 is off, the time constant provided by the resistor R6 and the capacitor C3 starts the cycle again. The diode CR3 is used to hold the gate of the transistor Q2 low and inhibit operation when the output of the control amplifier U1B is low.

FIG. 8b illustrates the circuitry of the chopper unit 22 in block diagram form. The thermistor 124 and the heating resistors 120 in the target 38 are connected to a chopper controller circuit 148. One suitable circuit for the chopper controller is illustrated in FIG. 9. In the preferred embodiment of our system, the circuit of FIG. 9 is used twice, once in the probe controller and the second time in the chopper controller. In one case the thermistor 112 and resistors 108 are the input and control devices, respectively. In the other case, the thermistor 124 and the resistors 120 are the input and control devices, respectively. The probe controller circuit 146 and the chopper controller circuit 148 both function in the same manner. As previously indicated, the chopper controller circuit is used to heat, regulate and maintain the aluminum target member 116 to a predetermined reference temperature, preferably 98° F. This permits the thermopile in the probe unit to be calibrated to a temperature near the core body temperature. As already indicated, this approach yields higher accuracy than if the target were allowed to fluctuate with the ambient room temperature.

Referring still to FIG. 8b, the circuitry of the chopper unit 22 further includes an amplifier 150 which is connected to the chopper controller circuit 148 and has an output corresponding to the chopper target temperature. This output is inputted to a microcomputer 152 through the analog switch 132 and the A/D converter 130. The A/D converter 130 has a voltage reference 154. By way of example, the microcomputer may be MOTOROLA type 146805G having 2K bytes of ROM and 128 bytes of RAM. The aforementioned microcomputer is preferably operated with a 2 MHz crystal 156. By way of example, the A/D converter 130 may be a 13 bit INTERSIL ICL7 109 device. The analog switch 132 may be a type CD4053 analog multiplexer which switches anyone of the following three analog inputs under the control of the microcomputer 152: thermopile signal on lead 144, chopper target signal on lead 158 and a battery condition on lead 160.

The microcomputer 152 (FIG. 8b) drives the display 52 through a driver circuit 162. By way of example, this circuit may be a type of COP472 chip. The keys 50 are in the form of a three position pad which is connected to the microcomputer 152 and is used to select one of four functions. The display 52 (FIG. 5) is used to indicate the following information to the user: (1) MODE: surface or tympanic; (2) UNITS: Fahrenheit or Centigrade; (3)

the temperature in degrees and tenths of a degree; (4) a low battery condition; (5) a SECURITY indicator which alerts the user that a security feature of the system has been armed; and (6) a " -OK" signal which indicates that the system is operating properly and is ready to take a patient's temperature.

The key pad 50 and SCAN key 56 may be manually actuated to select one of the following functions:

(1) "SCAN", if the system is in the "tympanic" mode selected by actuating one of the other buttons, depression of the SCAN key indicates that the probe has been introduced into the external ear canal and the tympanic algorithm hereafter described should be executed. If the "SURFACE" mode has been selected by depressing one of the other keys, depression of the SCAN key indicates that real time temperature should be displayed until the SCAN key is released: (2) "°C./°F."—successive depressions of this key alternately change the unit of measurement between Centigrade and Fahrenheit; (3) "TYMP" - depression of this key places the system in its tympanic mode; and (4) "SURF" - depression of this key places the system in its surface mode.

Simultaneous depression of the "TYMP" and "°C./°F." keys places the system into the calibration mode which is used when the system is assembled at the factory.

The microcomputer 152 is connected to an EEPROM 164 (FIG. 8b) which is used to store calibration data. This device is a 16×16 bit electrically erasable programmable read only memory. By way of example, this part may be a type NMC9306 chip.

The microcomputer 152 is also connected to an audio indicator 166 (FIG. 8b) which may take the form of a piezoelectric buzzer. This buzzer alerts the user when (1) any key is depressed; (2) the tympanic algorithm is completed and (3) during various situations when an alarm is required. The reed switch 66 provides a signal to the microcomputer 152 via security input line 168 to protect against unauthorized removal of the mated probe/chopper units from the charger unit 58. When the security system is armed, the user must press a plurality of the keys 50 in a certain sequence to disarm the system, otherwise the system will not operate to provide temperature measurements and the audio alarm will be sounded.

The circuitry of the chopper unit illustrated in FIG. 8b further includes a step-up circuit 170 which boosts the battery voltage from a nominal 2.4 volts to a nominal 7 volts, a voltage regulator 172 which regulates this voltage to approximately 5 volts, and a voltage converter 174 which converts the 5 volts to −5 volts.

A control program stored in the ROM of the microcomputer 152 is used to control and carry out the functions of the system hereafter described in greater detail. FIGS. 10-17 are flow diagrams of the various aspects of the control program which enable it to perform the system functions.

The sequence of events which takes place in order for the system to determine a patient's core temperature from infrared emissions in his or her external ear canal is as follows: (1) calibration through chopping during the time that the probe and chopper units are mated; (2) removal of the probe unit from the chopper unit; (3) insertion of the probe into a sanitary speculum; (4) positioning of the speculum-covered probe in the external ear canal; (5) tympanic algorhithm execution and display; (6) removal of the probe from the external ear canal and discarding of the speculum; and (7) re-mating of the probe and chopper units and re-initiation of recalibration through chopping.

Prior to taking a patient's temperature, the probe unit is cradled in the chopper unit. During this time, the microcomputer continuously samples the key pad, checks the battery condition, and calibrates the thermopile against the chopper reference target. The procedure to calibrate or chop involves the following. First, the microcomputer determines the chopper target temperature. Then the microcomputer determines the thermopile output level which corresponds to that temperature. Finally, the microcomputer determines whether the probe unit has been chopping for a requisite minimum time period to insure stability. The calibration or chopping which has just been described is a regular system function which is performed each time the probe unit is replaced on the chopper unit. This is to be distinguished from factory calibration in which the reference temperatures of the probe controller and chopper controller are established and calibration data is programmed into the EEPROM. This factory calibration is set forth in the flow diagrams of FIGS. 15 and 16.

In the standard calibration or chopping mode, the microcomputer repeatedly determines the digital equivalent of the thermopile output while the thermopile is sensing infrared radiations from the chopper target. The chopper controller circuit 148 maintains the temperature of the target at a very precise reference temperature, preferably 98° F., with a high degree of accuracy. Therefore, the microcomputer, in the standard calibration mode, is acquiring the digital representation of the thermopile output level for a known temperature, i.e. 98° F. Each time this digital equivalent is acquired, it is stored.

The user then removes the probe unit from the chopper unit and the microcomputer unit detects this by sensing of the opening of the reed switch 48 (FIG. 8b). If the requisite, preprogrammed minimum time period for chopping has not been met, the microcomputer sounds the audio alarm 166 and the user must replace the probe unit onto the chopper unit. If the requisite minimum time period for chopping has elapsed, the microcomputer starts acquiring the thermopile output level at the rate of approximately seven times per second and stores the maximum reading.

The manner of acquiring a thermopile temperature is as follows. The output level of the thermopile while looking at the target to be measured is acquired. From this the output level stored during the last chop is subtracted. The difference is multiplied by the gain of the thermopile to arrive at a temperature difference of the target relative to the chopper target. To this number is added the chopper target temperature taken during the last chop.

Before an actual tympanic temperature reading is taken, a disposable speculum is inserted over the tip of the probe. The user then inserts the speculum covered probe into the external ear canal using moderate pressure. The user then actuates the SCAN key to alert the microcomputer that the tympanic algorithm should commence. This step must be accomplished within ten seconds of removal of the probe unit from the chopper unit. If not completed within ten seconds, the microcomputer will sound the audio alarm. The probe unit must then be replaced on the chopper unit to allow adequate recalibration before the system will again be in condition for taking a tympanic membrane temperature reading. This ten second time limit prevents excessive drift while the probe unit is removed from the chopper.

Subsequent to the aforementioned actuation of the SCAN key, a number of thermopile temperature acquisitions are performed lasting for a period of approximately one second. The maximum reading from the beginning of the removal of the probe unit from the chopper unit is displayed as the tympanic temperature. After the readings have been completed, the LED 56 (FIG. 1) on the probe handle is illuminated and the audio indicator is energized to signal completion of the temperature reading process. The LED illumination and audio signal are discontinued.

Once the tympanic algorithm execution and measured temperature display have been completed, the speculum-covered probe is removed from the external ear canal. The speculum is removed and disposed of and the probe unit is replaced in the chopper unit. The system then goes through its standard calibration process again until the next function is initiated by depression of one or more of the keys 50 or removal of the probe unit.

Having described a preferred embodiment of our system it should be understood that modifications and adaptations therof will occur to persons skilled in the art. Therefore, the protection afforded our invention should only be limited in accordance with the scope of the following claims.

We claim:

1. A method of measuring body temperature comprising the steps of:
   preheating a probe assembly to a predetermined ear canal reference temperature, the probe assembly including an infrared level sensing device;
   calibrating an output signal of the infrared level sensing device to a predetermined substantially constant target reference temperature;
   inserting a portion of the preheated probe assembly into an ear canal of a patient;
   directing infrared radiation emitted in the ear canal to the infrared level sensing device;
   acquiring the output signal of the infrared sensing device;
   processing the output signal to determine an internal body temperature; and
   providing an indication of the internal body temperature to a user.

2. A method according to claim 1 wherein the calibrating step is accomplished by placing the probe assembly portion adjacent a target heated to the predetermined target reference temperature and repeatedly acquiring and storing the output signal of the infrared sensing device.

3. A method according to claim 2 wherein the output signal of the infrared sensing device is repeatedly acquired and stored when the probe assembly portion is inserted in the ear canal.

4. A method according to claim 3 wherein the processing step is accomplished by comparing a most recent output signal stored when the probe assembly portion was adjacent the target to a maximum output signal stored when the probe assembly portion was inserted in the ear canal.

5. A method according to claim 4 wherein the comparing step is performed within a predetermined maximum time interval between the removal of the probe assembly portion from the target and the insertion of the probe assembly portion in the ear canal to avoid an unacceptable level of drift.

6. An apparatus for measuring the internal temperature of a patient's body comprising:
   means for sensing the level of infrared radiation emitted in an ear canal of the patient and for producing an output signal representative of the sensed level, said sensing means comprising an infrared radiation sensor and means for directing infrared radiation emitted in the ear canal to the infrared radiation sensor;
   means located outside the ear canal for thermostatically maintaining the environment of the infrared radiation sensor at a predetermined substantially constant reference temperature;
   means for determining the internal body temperature based upon the output signal of the sensing means; and
   means for calibrating the determining means.

7. In combination,
   an infrared sensor;
   a housing supporting and thermally connected to the infrared sensor, the housing including a metal body having a recess in which the infrared sensor is received;
   means mounted in the metal body for heating the metal body upon application of first electrical signals thereto;
   a hollow probe dimensioned and configured for insertion into the external ear canal and being made of a non-metallic material for minimizing conductive heat transfer when in contact with the skin of the ear canal;
   a waveguide thermally coupled to the housing for directing infrared emissions to the sensor, the waveguide being dimensioned to extend within the probe; and
   means for supporting the waveguide within the probe and spaced therefrom for directing infrared radiation from the ear canal to the infrared sensor.

8. The combination of claim 7 wherein the waveguide includes a cylindrical metal tube.

9. The combination of claim 8 wherein the probe includes a plastic tubular portion concentrically positioned relative to the metal tube of the waveguide.

10. The combination of claim 8 wherein the waveguide further includes a layer of gold covering an interior wall of the metal tube.

11. The combination of claim 7 and further comprising means mounted in the metal body for generating second signals representative of the temperature of the metal body.

12. The combination of claim 7 and further comprising a quantity of thermal grease packed between the sensor and a wall portion of the metal body defining the recess.

13. The combination of claim 7 and further comprising a speculum removably mounted over a tip of the probe and including a film membrane substantially transparent to infrared radiation and extending across, and spaced from, an end of the waveguide remote from the housing, the speculum being dimensioned and configured for partial insertion into the ear canal.

* * * * *